(12) United States Patent
Chouvel et al.

(10) Patent No.: US 10,081,723 B2
(45) Date of Patent: Sep. 25, 2018

(54) TIRE TREAD COMPRISING A THERMOPLASTIC ELASTOMER

(71) Applicants: COMPAGNIE GENERALE DES ETABLISSEMENTS MICHELIN, Clermont-Ferrand (FR); Michelin Recherche et Technique S.A., Granges-Paccot (CH)

(72) Inventors: Christophe Chouvel, Clermont-Ferrand (FR); José-Carlos Araujo Da Silva, Clermont-Ferrand (FR)

(73) Assignee: Compagnie Generale Des Etablissements Michelin, Clermont-Ferrand (FR)

( * ) Notice: Subject to any disclaimer, the term of this patent is extended or adjusted under 35 U.S.C. 154(b) by 17 days.

(21) Appl. No.: 15/105,850

(22) PCT Filed: Dec. 19, 2014

(86) PCT No.: PCT/EP2014/078691
§ 371 (c)(1),
(2) Date: Jun. 17, 2016

(87) PCT Pub. No.: WO2015/091926
PCT Pub. Date: Jun. 25, 2015

(65) Prior Publication Data
US 2016/0319111 A1    Nov. 3, 2016

(30) Foreign Application Priority Data
Dec. 20, 2013 (FR) ..................... 13 63143

(51) Int. Cl.
| C08K 7/00 | (2006.01) |
| C08L 7/00 | (2006.01) |
| B60C 1/00 | (2006.01) |
| C08L 53/02 | (2006.01) |

(52) U.S. Cl.
CPC ............. *C08L 7/00* (2013.01); *B60C 1/0016* (2013.01); *C08L 53/02* (2013.01); *C08L 2205/06* (2013.01); *C08L 2312/00* (2013.01)

(58) Field of Classification Search
CPC ....................................... C08L 7/00
USPC ....................................... 523/156
See application file for complete search history.

(56) References Cited

U.S. PATENT DOCUMENTS

| 5,204,407 | A | 4/1993 | Araki et al. ............. 525/99 |
| 5,756,589 | A | 5/1998 | Sandstrom et al. ....... 525/333.1 |
| 5,925,713 | A | 7/1999 | Labauze ................... 524/572 |
| 5,977,238 | A | 11/1999 | Labauze ................... 524/492 |
| 6,013,718 | A | 1/2000 | Cabioch et al. ........... 524/506 |
| 6,204,322 | B1 | 3/2001 | Labauze ................... 524/572 |
| 6,344,518 | B1 | 2/2002 | Kobayashi et al. ......... 524/862 |
| 6,774,255 | B1 | 8/2004 | Tardivat et al. ............. 556/427 |
| 7,250,463 | B2 | 7/2007 | Durel et al. .................. 524/492 |
| 7,300,970 | B2 | 11/2007 | Durel et al. .................. 524/493 |
| 7,342,070 | B2 | 3/2008 | Tsukimawashi et al. ..... 525/105 |
| 7,488,768 | B2 | 2/2009 | Tardivat et al. ............. 524/262 |
| 7,491,767 | B2 | 2/2009 | Durel et al. .................. 524/493 |
| 8,163,821 | B2 | 4/2012 | Hiro |
| 8,492,475 | B2 | 7/2013 | Araujo Da Silva et al. ......... 524/552 |
| 8,557,937 | B1 | 10/2013 | Fisher et al. |
| 9,080,041 | B2 | 7/2015 | Lopitaux et al. ......... C08L 7/00 |
| 2004/0051210 | A1 | 3/2004 | Tardivat et al. ............. 264/349 |
| 2004/0254301 | A1 | 12/2004 | Tsukimawashi et al. ..... 525/271 |
| 2005/0004297 | A1 | 1/2005 | Durel et al. .................. 524/493 |
| 2005/0016650 | A1 | 1/2005 | Durel et al. ............... 152/209.1 |
| 2005/0016651 | A1 | 1/2005 | Durel et al. ............... 152/209.1 |
| 2009/0186961 | A1 | 7/2009 | Araujo Da Silva et al. ......... 523/150 |
| 2009/0209709 | A1 | 8/2009 | Araujo Da Silva et al. ......... 525/333.1 |
| 2009/0234066 | A1 | 9/2009 | Araujo Da Silva et al. ......... 524/571 |
| 2010/0249270 | A1 | 9/2010 | Robert et al. .................. 523/150 |
| 2011/0152458 | A1 | 6/2011 | Araujo Da Silva et al. ......... 525/102 |
| 2011/0178233 | A1 | 7/2011 | Chaboche et al. ............ 524/571 |
| 2012/0003413 | A1 | 1/2012 | Lesage et al. |
| 2012/0065292 | A1* | 3/2012 | Lopitaux ............... B60C 1/0016 523/150 |
| 2012/0214933 | A1 | 8/2012 | Lopez et al. |
| 2012/0309865 | A1* | 12/2012 | Lopez .................. B60C 1/0016 523/156 |
| 2012/0318424 | A1 | 12/2012 | Lopitaux et al. ............. 152/526 |

(Continued)

FOREIGN PATENT DOCUMENTS

| CN | 102712790 A | 10/2012 |
| CN | 102770284 A | 11/2012 |

(Continued)

OTHER PUBLICATIONS

U.S. Appl. No. 15/105,918, filed Dec. 19, 2014.
International Search Report dated Mar. 25, 2015, issued by EPO in connection with International Application No. PCT/EP2014/078691.
S. Brunauer, et al., "Adsorption of Gases in Multimolecular Layers", J. Am. Chem. Soc., vol. 60, pp. 309-319 (1938).

(Continued)

Primary Examiner — Doris L Lee
(74) Attorney, Agent, or Firm — Fitzpatrick, Cella, Harper & Scinto

(57) ABSTRACT

A tire tread comprises a composition based on at least an elastomer matrix comprising a polyisoprene and an unsaturated thermoplastic styrene elastomer which represents at most 50% by weight of the elastomer matrix, a reinforcing filler and a crosslinking system. The unsaturated thermoplastic styrene elastomer comprises at least one rigid styrene segment and at least one flexible isoprene segment, which at least one flexible isoprene segment has a glass transition temperature of less than −20° C. Such a tread exhibits an improved resistance to crack propagation.

30 Claims, No Drawings

(56) References Cited

U.S. PATENT DOCUMENTS

| | | | |
|---|---|---|---|
| 2012/0318425 A1 | 12/2012 | Lopez et al. | 152/526 |
| 2013/0005894 A1 | 1/2013 | Lopitaux et al. | 524/432 |
| 2013/0116376 A1 | 5/2013 | Custodero et al. | 524/526 |
| 2013/0220509 A1 | 8/2013 | Rehab et al. | 152/564 |

FOREIGN PATENT DOCUMENTS

| | | |
|---|---|---|
| EP | 0 470 693 A2 | 2/1992 |
| EP | 0 692 492 A1 | 1/1996 |
| EP | 0 778 311 B1 | 6/1997 |
| EP | 0 831 121 A1 | 3/1998 |
| EP | 0 890 607 A1 | 1/1999 |
| EP | 1 000 970 A1 | 5/2000 |
| EP | 1 457 501 A1 | 9/2004 |
| FR | 2 952 644 A1 | 5/2011 |
| FR | 2 954 333 A1 | 6/2011 |
| FR | 2 955 116 A1 | 7/2011 |
| WO | 96/37547 | 11/1996 |
| WO | 97/36724 A2 | 10/1997 |
| WO | 99/16600 A1 | 4/1999 |
| WO | 99/28380 | 6/1999 |
| WO | 02/30939 A1 | 4/2002 |
| WO | 02/31041 A1 | 4/2002 |
| WO | 03/002648 A1 | 1/2003 |
| WO | 03/002649 A1 | 1/2003 |
| WO | 03/016387 A1 | 2/2003 |
| WO | 2006/125532 A1 | 11/2006 |
| WO | 2006/125533 A1 | 11/2006 |
| WO | 2006/125534 A1 | 11/2006 |
| WO | 2009/000750 A1 | 12/2008 |
| WO | 2009/133068 A1 | 11/2009 |
| WO | WO 2011/061145 * | 5/2011 |
| WO | 2011/076635 A1 | 6/2011 |
| WO | 2011/161222 A1 | 12/2011 |
| WO | 2012/052522 A1 | 4/2012 |

OTHER PUBLICATIONS

W. Hofmann, Rubber Technology Handbook, Hanser Publishers, New York, section 3.6 "A Comparison of Properties and Uses of Different Rubbers", pp. 161-176 ( 1989).

Fact Sheet K0151, Kraton Polymers, Providing Improved Performance for Adhesives, Sealants and Coatings, Jan. 2001 (11 pages).

* cited by examiner

TIRE TREAD COMPRISING A THERMOPLASTIC ELASTOMER

FIELD OF THE INVENTION

The field of the present invention is that of treads for tyres.

RELATED ART

During running, a tyre tread is subjected to mechanical stresses and attacks resulting from the direct contact with the ground, which has the effect of creating incipient cracks in the tread. These stresses and these attacks are exerted on the tread cyclically at each turn of the wheel. The consequence of this periodicity is that the incipient cracks which are created in the tread have a tendency to propagate at the surface of or inside the tread. Crack propagation in the tread can result in damage to the tread and can thus reduce the lifetime of the tread or of the tyre.

It is thus important to have available tyres, the tread of which exhibits a resistance to crack propagation which is sufficiently strong to minimize the effect of an incipient crack on the lifetime of the tread. In order to solve this problem, tyre manufacturers use, for example, natural rubber in the treads due to the properties of resistance to crack propagation of natural rubber, as mentioned in Table 3.7, Comparison of elastomers properties, pp. 162-163, Rubber Technology Handbook, Hofmann, Hanser Publishers (1989).

Nevertheless, there still exists a need to further improve the resistance to crack propagation of tyre treads.

The Applicant Companies have discovered that the introduction of a certain content of specific unsaturated thermoplastic styrene elastomer into a specific rubber composition used as tread for a tyre makes it possible to improve the resistance to crack propagation without substantially damaging the other performance properties of the tread, which are the wear and the rolling resistance.

BRIEF DESCRIPTION OF EMBODIMENTS OF THE INVENTION

Thus, a first subject-matter of the invention is a tyre tread comprising a composition based on at least:
 an elastomer matrix comprising a polyisoprene and an unsaturated thermoplastic styrene elastomer which represents at most 50% by weight of the elastomer matrix, which unsaturated thermoplastic styrene elastomer comprises at least one rigid styrene segment and at least one flexible isoprene segment, which at least one flexible isoprene segment has a glass transition temperature of less than −20° C.,
 a reinforcing filler,
 a crosslinking system.

Another subject-matter of the invention is a tyre which comprises the tread in accordance with the invention.

Another subject-matter of the invention is a process for preparing the tread in accordance with the invention.

Another subject-matter of the invention is a rubber composition which is identical to the composition of the tread in accordance with the invention, with the condition that, if the reinforcing filler comprises a carbon black, the carbon black exhibits a BET specific surface of greater than or equal to 90 $m^2/g$.

Another subject-matter of the invention is a process for preparing the rubber composition in accordance with the invention.

I. Measurements and Tests Used

Resistance to crack propagation:

The rate of cracking was measured on test specimens of rubber compositions using a cyclic fatigue device (Elastomer Test System) of the 381 type from MTS, as explained below.

The resistance to cracking is measured using repeated tensile actions on a test specimen initially accommodated (after a first tensile cycle) and then notched. The tensile test specimen is composed of a rubber plaque of parallelepipedal shape, for example with a thickness of between 1 and 2 mm, with a length between 130 and 170 mm and with a width between 10 and 15 mm, the two side edges each being covered in the direction of the length with a cylindrical rubber strip (diameter 5 mm) making possible anchoring in the jaws of the tensile testing device. The test specimens thus prepared are tested in the fresh state. The test was carried out in air, at a temperature of 20° C., 60° C. or 80° C. After accommodation, 3 very fine notches with a length of between 15 and 20 mm are produced using a razor blade, at mid-width and aligned in the direction of the length of the test specimen, one at each end and one at the centre of the latter, before starting the test. At each tensile cycle, the degree of deformation of the test specimen is automatically adjusted so as to keep the energy restitution level (amount of energy released during the progression of the crack) constant at a value of less than or equal to approximately 500 $J/m^2$. The crack propagation rate is measured in nanometres per cycle. The resistance to crack propagation will be expressed in relative units (r.u.) by dividing the propagation rate of the control by that of the mixture, the rates being measured at the same energy restitution level. A value greater than that of the control, arbitrarily set at 100, indicates an improved result, that is to say a greater resistance to crack propagation.

II-DETAILED DESCRIPTION OF THE INVENTION

In the present description, unless expressly indicated otherwise, all the percentages (%) shown are % by weight. The abbreviation "phr" means parts by weight per hundred parts of elastomers present in the elastomer matrix, the elastomer matrix denoting all of the elastomers present in the rubber composition.

Furthermore, any interval of values denoted by the expression "between a and b" represents the range of values greater than "a" and lower than "b" (that is to say, limits a and b excluded), whereas any interval of values denoted by the expression "from a to b" means the range of values extending from "a" up to "b" (that is to say, including the strict limits a and b).

The expression "composition based on" should be understood as meaning, in the present description, a composition comprising the mixture and/or the in situ reaction product of the various constituents used, some of these base constituents (for example the elastomer, the filler or other additive conventionally used in a rubber composition intended for the manufacture of tyres) being capable of reacting or intended to react with one another, at least in part, during the various phases of manufacture of the composition intended for the manufacture of tyres.

The elastomer matrix of the rubber composition has the essential characteristic of comprising a polyisoprene. The polyisoprene can be an elastomer of any microstructure. Preferably, the polyisoprene comprises a content by weight of cis-1,4—bonds of at least 90% of the weight of the polyisoprene. Natural rubber, a synthetic polyisoprene or their mixture is suitable as polyisoprene having this preferred microstructure.

The elastomer matrix of the rubber composition of the tread of the tyre in accordance with the invention may contain a second diene elastomer. Second diene elastomer is understood to mean one or more diene elastomers other than polyisoprene.

A "diene" elastomer (or without distinction rubber) should be understood, in a known way, as meaning an (or several) elastomer composed, at least in part (i.e., a homopolymer or a copolymer), of diene monomer units (monomers bearing two conjugated or non-conjugated carbon-carbon double bonds).

These diene elastomers can be classified into two categories: "essentially unsaturated" or "essentially saturated". Generally, "essentially unsaturated" is understood to mean a diene elastomer resulting at least in part from conjugated diene monomers having a content of units of diene origin (conjugated dienes) which is greater than 15% (mol %); thus it is that diene elastomers such as butyl rubbers or copolymers of dienes and a-olefins of EPDM type do not come within the preceding definition and can in particular be described as "essentially saturated" diene elastomers (low or very low content, always less than 15%, of units of diene origin). In the category of "essentially unsaturated" diene elastomers, "highly unsaturated" diene elastomer is understood to mean in particular a diene elastomer having a content of units of diene origin (conjugated dienes) which is greater than 50%.

Given these definitions, diene elastomer capable of being used in the compositions in accordance with the invention is understood more particularly to mean:
(a) any homopolymer of a conjugated diene monomer, in particular any homopolymer obtained by polymerization of a conjugated diene monomer having from 4 to 12 carbon atoms;
(b) any copolymer obtained by copolymerization of one or more conjugated dienes with one another or with one or more vinylaromatic compounds having from 8 to 20 carbon atoms;
(c) a ternary copolymer obtained by copolymerization of ethylene and an a-olefin having from 3 to 6 carbon atoms with a non-conjugated diene monomer having from 6 to 12 carbon atoms, such as, for example, the elastomers obtained from ethylene and propylene with a non-conjugated diene monomer of the abovementioned type, such as, in particular, 1,4-hexadiene, ethylidenenorbornene or dicyclopentadiene;
(d) a copolymer of isobutene and of isoprene (butyl rubber) and also the halogenated versions, in particular chlorinated or brominated versions, of this type of copolymer.

Although it applies to any type of diene elastomer, a person skilled in the art of tyres will understand that the present invention is preferably employed with essentially unsaturated diene elastomers, in particular of the above type (a) or (b).

In the case of copolymers of the type (b), the latter comprise from 20% to 99% by weight of diene units and from 1% to 80% by weight of vinylaromatic units.

The following are suitable in particular as conjugated dienes: 1,3-butadiene, 2-methyl-1,3-butadiene, 2,3-di($C_1$-$C_5$ alkyl)-1,3-butadienes, such as, for example, 2,3-dimethyl-1,3-butadiene, 2,3-diethyl-1,3-butadiene, 2-methyl-3-ethyl-1,3-butadiene or 2-methyl-3-isopropyl-1,3-butadiene, an aryl-1,3-butadiene, 1,3-pentadiene or 2,4-hexadiene.

The following, for example, are suitable as vinylaromatic compounds: styrene, ortho-, meta- or para-methylstyrene, the "vinyltoluene" commercial mixture, para-(tert-butyl) styrene, methoxystyrenes, chlorostyrenes, vinylmesitylene, divinylbenzene or vinylnaphthalene.

Preferably, the second diene elastomer is an essentially unsaturated elastomer selected from the group consisting of polybutadienes, butadiene copolymers, isoprene copolymers and the mixtures of these elastomers. The following are very particularly suitable as diene elastomer: a polybutadiene (BR) or a copolymer of butadiene and styrene (SBR).

According to one embodiment of the invention, the polyisoprene represents more than 50% of the difference between the weight of the elastomer matrix and the weight of the unsaturated thermoplastic styrene elastomer, which amounts to saying that the polyisoprene exhibits a fraction by weight of greater than 50% with respect to the total weight of the non-thermoplastic elastomers of the elastomer matrix. According to this embodiment, suitable as elastomer matrix is, for example, a mixture consisting of 40% by weight of an unsaturated thermoplastic styrene elastomer, of 45% by weight of a natural rubber and of 15% by weight of an SBR, the percentages being calculated on the basis of the total weight of the elastomer matrix.

According to another embodiment of the invention, the polyisoprene represents more than 50% by weight of the elastomer matrix. According to this embodiment, suitable as elastomer matrix is, for example, a mixture consisting of 40% by weight of an unsaturated thermoplastic styrene elastomer, of 55% by weight of a natural rubber and of 5% by weight of an SBR, the percentages being calculated on the basis of the total weight of the elastomer matrix.

According to a preferred embodiment of the invention, only the polyisoprene and the unsaturated thermoplastic styrene elastomer constitute the elastomer matrix, which means that the elastomer matrix does not contain other elastomers than the polyisoprene and the unsaturated thermoplastic styrene elastomer.

The unsaturated thermoplastic styrene elastomer comprises at least one rigid styrene segment and at least one flexible isoprene segment, which at least one flexible isoprene segment has a glass transition temperature of less than −20° C. The rigid and flexible segments can be positioned linearly, or in a star or branched configuration.

A flexible segment refers to a polymer block of elastomer type and a rigid segment refers to a polymer block of thermoplastic type.

A thermoplastic styrene elastomer is described as unsaturated thermoplastic styrene elastomer when the at least one flexible isoprene segment comprises nonaromatic ethylenic carbon-carbon double bonds, these double bonds being those of the isoprene units.

Flexible isoprene segment is understood to mean a flexible segment which is at least partly composed of isoprene units. The at least one flexible isoprene segment is preferably a polyisoprene block. This preferred embodiment of the invention applies to any one of the embodiments of the invention.

According to one embodiment of the invention, the unsaturated thermoplastic styrene elastomer is a diblock. The diblock comprises just one rigid styrene segment connected to just one flexible isoprene segment.

According to a preferred embodiment of the invention, the unsaturated thermoplastic styrene elastomer comprises at least two rigid styrene segments. According to this preferred embodiment of the invention, generally at least two ends of chains of the unsaturated thermoplastic styrene elastomer are each provided with a rigid styrene segment and the rigid styrene segments are connected via the flexible isoprene segment or segments. According to this preferred embodiment of the invention, the unsaturated thermoplastic styrene elastomer is preferably a triblock. The triblock is then composed of two rigid styrene segments and of one flexible isoprene segment.

In the case where the unsaturated thermoplastic styrene elastomer is a diblock, the designation of "the at least one rigid segment" denotes the rigid segment present in the unsaturated thermoplastic styrene elastomer. In the cases other than a diblock, for example in the case of a triblock, the designation of "the at least one rigid segment" denotes the rigid segments present in the unsaturated thermoplastic styrene elastomer.

In the case where the unsaturated thermoplastic styrene elastomer is a diblock or a triblock, the designation of "the at least one flexible segment" denotes the flexible segment present in the unsaturated thermoplastic styrene elastomer. In the cases where the unsaturated thermoplastic styrene elastomer is neither a diblock nor a triblock, the designation of "the at least one flexible segment" denotes the flexible segments present in the unsaturated thermoplastic styrene elastomer.

The at least one rigid styrene segment is the homopolymer of a styrene monomer or the block or random copolymer of several styrene monomers or also the copolymer of one or more styrene monomers and of another non-styrene monomer, such as a 1,3-diene.

Styrene monomer should be understood, in the present description, as meaning styrene or a substituted styrene. Mention may be made, among substituted styrenes, for example, of methylstyrenes (for example, o-methylstyrene, m-methylstyrene or p-methylstyrene, α-methylstyrene, α,2-dimethylstyrene, α,4-dimethylstyrene or diphenylethylene), para-(tert-butyl)styrene, chlorostyrenes (for example, o-chlorostyrene, m-chlorostyrene, p-chlorostyrene, 2,4-dichlorostyrene, 2,6-dichlorostyrene or 2,4,6-trichlorostyrene), bromostyrenes (for example, o-bromostyrene, m-bromostyrene, p-bromostyrene, 2,4-dibromostyrene, 2,6-dibromostyrene or 2,4,6-tribromostyrene), fluorostyrenes (for example, o-fluorostyrene, m-fluorostyrene, p-fluorostyrene, 2,4-difluorostyrene, 2,6-difluorostyrene or 2,4,6-trifluorostyrene) or also para-hydroxystyrene.

According to a preferred embodiment of the invention, the at least one rigid styrene segment exhibits a glass transition temperature of greater than 80° C. Preferably, the at least one rigid styrene segment is a polystyrene block.

Suitable as unsaturated thermoplastic styrene elastomer are the styrene/isoprene (SI) diblock copolymers and the styrene/isoprene/styrene (SIS) triblock copolymers.

Also suitable as unsaturated thermoplastic styrene elastomer are the mixtures of an abovementioned triblock copolymer and of an abovementioned diblock copolymer. This is because the triblock copolymer can comprise a minor fraction by weight of diblock copolymer consisting of a rigid styrene segment and of a flexible isoprene segment, the rigid block and the flexible block being respectively of the same chemical nature, in particular of the same microstructure, as the rigid and flexible blocks of the triblock. The presence of the diblock copolymer in the triblock copolymer generally results from the process of synthesis of the triblock copolymer, which can result in the formation of byproduct, such as the diblock copolymer. Generally, the percentage of diblock copolymer in the triblock copolymer does not exceed 40% by weight of triblock copolymer.

According to a preferred embodiment of the invention, the content by weight of the at least one rigid styrene segment is between 5 and 40% of the weight of the unsaturated thermoplastic styrene elastomer. Below the minimum indicated, there is a risk of the thermoplastic nature of the unsaturated thermoplastic styrene elastomer being substantially reduced while, above the recommended maximum, the elasticity of the composition can be affected. For these reasons, the content by weight of the at least one rigid styrene segment in the unsaturated thermoplastic styrene elastomer is preferably within a range extending from 10 to 35%, more preferably from 10 to 20%, of the weight of the unsaturated thermoplastic styrene elastomer. These contents, whether or not they are preferred, apply to any one of the embodiments of the invention, very particularly when the polystyrene forms the at least one rigid styrene segment of the unsaturated thermoplastic styrene elastomer.

The number-average molar mass (denoted Mn) of the unsaturated thermoplastic styrene elastomer is preferably between 50 000 and 500 000 g/mol, more preferably between 60 000 and 450 000 g/mol and more preferably still between 80 000 and 300 000 g/mol. Advantageously, it is between 100 000 and 200 000 g/mol. These preferred ranges of number-average molar mass values apply whatever the embodiment of the invention.

The molar mass is determined, in a known way, by size exclusion chromatography (SEC). The sample is dissolved beforehand in tetrahydrofuran at a concentration of approximately 1 g/l and then the solution is filtered through a filter with a porosity of 0.45 μm before injection. The apparatus used is a Waters Alliance chromatographic line. The elution solvent is tetrahydrofuran, the flow rate is 0.7 ml/min, the temperature of the system is 35° C. and the analytical time is 90 min. A set of four Waters columns in series, with the Styragel tradenames (HMW7, HMW6E and two HT6E), is used. The injected volume of the solution of the polymer sample is 100 μl. The detector is a Waters 2410 differential refractometer and its associated software, for making use of the chromatographic data, is the Waters Millennium system. The calculated number-average molar masses are relative to a calibration curve produced with polystyrene standards.

The unsaturated thermoplastic styrene elastomer is present in a proportion by weight of at most 50% of the weight of the elastomer matrix of the rubber composition of the tread. Above the maximum value indicated, there is no longer a benefit with regard to the resistance to crack propagation of the rubber composition forming the tread of a tyre. The content of unsaturated thermoplastic styrene elastomer varies within a range extending preferably from 5 to 50%, more preferably from 10 to 45% and more preferably still from 20 to 45% by weight of the weight of the elastomer matrix. Advantageously, it varies from 25 to 45% by weight of the weight of the elastomer matrix. When the unsaturated thermoplastic styrene elastomer is a mixture of unsaturated thermoplastic styrene elastomers in accordance with the invention, the contents shown apply to the mixture and not to each of the unsaturated thermoplastic styrene elastomers. These contents, whether or not they are preferred, apply to any one of the embodiments of the invention.

The at least one flexible isoprene segment exhibits a Tg preferably of less than −30° C., more preferably of less than −40° C. and more preferably still of less than −50° C. The glass transition temperature is measured by means of a differential calorimeter (Differential Scanning calorimeter) according to Standard ASTM D3418 (1999).

The reinforcing filler can be any type of "reinforcing" filler known for its abilities to reinforce a rubber composition which can be used for the manufacture of tyres, for example an organic filler, such as carbon black, a reinforcing inorganic filler, such as silica, with which is combined, in a known way, a coupling agent, or also a mixture of these two types of fillers.

A reinforcing filler typically consists of nanoparticles, the (weight-)average size of which is less than a micrometre, generally less than 500 nm, generally between 20 and 200 nm, in particular and more preferably between 20 and 150 nm.

The reinforcing filler can comprise a carbon black. Preferably, the carbon black exhibits a BET specific surface of at least 90 $m^2/g$. The blacks conventionally used in tyres or their treads ("tyre-grade" blacks) are suitable as such. Mention will more particularly be made, among the latter, of the reinforcing carbon blacks of the 100, 200 or 300 series (ASTM grade), such as, for example, the N115, N134, N234 or N375 blacks. More preferably, the carbon black exhibits a BET specific surface of at least 100 $m^2/g$. The carbon blacks can be used in the isolated state, as available commercially, or in any other form, for example as support for some of the rubber additives used. The carbon blacks might, for example, be already incorporated in an isoprene elastomer in the form of a masterbatch (see, for example, Application WO 97/36724 or WO 99/16600). The BET specific surface of the carbon blacks is measured according to Standard D6556-10 [multipoint (at a minimum 5 points) method—gas: nitrogen—relative pressure p/po range: 0.1 to 0.3].

The reinforcing filler can comprise a reinforcing inorganic filler. The term "reinforcing inorganic filler" should be understood here as meaning any inorganic or mineral filler, whatever its colour and its origin (natural or synthetic), also known as "white filler", "clear filler" or even "non-black filler", in contrast to carbon black, capable of reinforcing, by itself alone, without means other than an intermediate coupling agent, a rubber composition intended for the manufacture of pneumatic tyres, in other words capable of replacing, in its reinforcing role, a conventional tyre-grade carbon black; such a filler is generally characterized, in a known way, by the presence of hydroxyl (—OH) groups at its surface.

Mineral fillers of the siliceous type, preferably silica ($SiO_2$), are suitable in particular as reinforcing inorganic fillers. The silica used can be any reinforcing silica known to a person skilled in the art, in particular any precipitated or fumed silica exhibiting a BET specific surface and a CTAB specific surface both of less than 450 $m^2/g$, preferably from 30 to 400 $m^2/g$, in particular between 60 and 300 $m^2/g$. Mention may be made, as example of silica of use for the requirements of the invention, of the Ultrasil VN3 silica sold by Evonik. Mention will be made, as highly dispersible precipitated silicas ("HDSs"), for example, of the Ultrasil 7000 and Ultrasil 7005 silicas from Degussa, the Zeosil 1165MP, 1135MP and 1115MP silicas from Rhodia, the Hi-Sil EZ150G silica from PPG, the Zeopol 8715, 8745 and 8755 silicas from Huber or the silicas having a high specific surface as described in Application WO 03/016387.

The physical state under which the reinforcing inorganic filler is provided is not important, whether it is in the form of a powder, microbeads, granules or also beads. Of course, reinforcing inorganic filler is also understood to mean mixtures of different reinforcing inorganic fillers, in particular of highly dispersible silicas as described above.

A person skilled in the art will understand that use might be made, as filler equivalent to the reinforcing inorganic filler described in the present section, of a reinforcing filler of another nature, in particular organic nature, such as carbon black, provided that this reinforcing filler is covered with an inorganic layer, such as silica, or else comprises, at its surface, functional sites, in particular hydroxyl sites, requiring the use of a coupling agent in order to establish the bond between the filler and the elastomer. Mention may be made, by way of example, for example, of carbon blacks for tyres, such as described, for example, in patent documents WO 96/37547 and WO 99/28380.

In the present account, as regards the silica, the BET specific surface is determined in a known way by gas adsorption using the Brunauer-Emmett-Teller method described in *The Journal of the American Chemical Society*, Vol. 60, page 309, February 1938, more specifically according to French Standard NF ISO 9277 of December 1996 (multipoint (5 point) volumetric method—gas: nitrogen—degassing: 1 hour at 160° C. —relative pressure p/po range: 0.05 to 0.17). The CTAB specific surface is the external surface determined according to French Standard NF T 45-007 of November 1987 (method B).

In order to couple the reinforcing inorganic filler to the diene elastomer, use is made, in a well-known way, of an at least bifunctional coupling agent, in particular a silane, (or bonding agent) intended to provide a satisfactory connection, of chemical and/or physical nature, between the inorganic filler (surface of its particles) and the diene elastomer. Use is made in particular of at least bifunctional organosilanes or polyorganosiloxanes.

Use is made in particular of silane polysulphides, referred to as "symmetrical" or "unsymmetrical" depending on their specific structure, such as described, for example, in Applications WO 03/002648 (or US 2005/016651) and WO 03/002649 (or US 2005/016650).

Particularly suitable, without the definition below being limiting, are silane polysulphides corresponding to the general formula (V):

$$Z\text{-}A\text{-}S_x\text{-}A\text{-}Z \quad (V)$$

in which:
x is an integer from 2 to 8 (preferably from 2 to 5);
the A symbols, which are identical or different, represent a divalent hydrocarbon radical (preferably a $C_1$-$C_{18}$ alkylene group or a $C_6$-$C_{12}$ arylene group, more particularly a $C_1$-$C_{10}$, in particular $C_1$-$C_4$, alkylene, especially propylene);
the Z symbols, which are identical or different, correspond to one of the three formulae below:

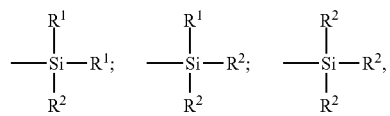

in which:
the $R^1$ radicals, which are substituted or unsubstituted and identical to or different from one another, represent a $C_1$-$C_{18}$ alkyl, $C_5$-$C_{18}$ cycloalkyl or $C_6$-$C_{18}$ aryl group (preferably $C_1$-$C_6$ alkyl, cyclohexyl or phenyl groups, in particular $C_1$-$C_4$ alkyl groups, more particularly methyl and/or ethyl);
the $R^2$ radicals, which are substituted or unsubstituted and identical to or different from one another, represent a $C_1$-$C_{18}$ alkoxyl or $C_5$-$C_{18}$ cycloalkoxyl group (preferably a group chosen from $C_1$-$C_8$ alkoxyls and $C_5$-$C_8$ cycloalkoxyls, more preferably still a group chosen from $C_1$-$C_4$ alkoxyls, in particular methoxyl and ethoxyl).

In the case of a mixture of alkoxysilane polysulphides corresponding to the above formula (I), in particular normal commercially available mixtures, the mean value of the "x" indices is a fractional number preferably of between 2 and 5, more preferably of approximately 4. However, the invention can also advantageously be carried out, for example, with alkoxysilane disulphides (x=2).

Mention will more particularly be made, as examples of silane polysulphides, of bis((C$_1$-C$_4$)alkoxyl(C$_1$-C$_4$)alkylsilyl(C$_1$-C$_4$)alkyl) polysulphides (in particular disulphides, trisulphides or tetrasulphides), such as, for example, bis(3-trimethoxysilylpropyl) or bis(3-triethoxysilylpropyl) polysulphides. Use is made in particular, among these compounds, of bis(3-triethoxysilylpropyl) tetrasulphide, abbreviated to TESPT, of formula $[(C_2H_5O)_3Si(CH_2)_3S_2]_2$, or bis(3-triethoxysilylpropyl) disulphide, abbreviated to TESPD, of formula $[(C_2H_5O)_3Si(CH_2)_3S]_2$.

Mention will in particular be made, as coupling agent other than alkoxysilane polysulphide, of bifunctional POSs (polyorganosiloxanes), or else of hydroxysilane polysulphides, such as described in Patent Applications WO 02/30939 (or U.S. Pat. No. 6,774,255) and WO 02/31041 (or US 2004/051210), or else of silanes or POSs bearing azodicarbonyl functional groups, such as described, for example, in Patent Applications WO 2006/125532, WO 2006/125533 and WO 2006/125534.

The content of coupling agent is advantageously less than 20 phr, it being understood that it is generally desirable to use as little as possible of it. Typically, the content of coupling agent represents from 0.5% to 15% by weight, with respect to the amount of inorganic filler. Its content is preferably between 0.5 and 12 phr, more preferably within a range extending from 3 to 10 phr. This content is easily adjusted by a person skilled in the art depending on the content of inorganic filler used in the composition.

The rubber composition in accordance with the invention can also comprise, in addition to the coupling agents, coupling activators, agents for covering the inorganic fillers or more generally processing aids capable, in a known way, by virtue of an improvement in the dispersion of the filler in the rubber matrix and of a lowering in the viscosity of the compositions, of improving their ease of processing in the raw state, these processing aids being, for example, hydrolysable silanes, such as alkylalkoxysilanes (in particular alkyltriethoxysilanes), polyols, polyethers (for example, polyethylene glycols), primary, secondary or tertiary amines (for example, trialkanolamines), hydroxylated or hydrolysable POSs, for example α,ω-dihydroxypolyorganosiloxanes (in particular α,ω-dihydroxypolydimethylsiloxanes), or fatty acids, such as, for example, stearic acid.

According to an alternative form of the invention, the carbon black represents more than 50% by weight of the reinforcing filler of the rubber composition. The carbon black is then regarded as the predominant reinforcing filler.

According to one embodiment of this alternative form, the silica can be used at contents ranging from 2 to 35 phr, preferably from 3 to 25 phr and in particular from 5 to 20 phr. According to this embodiment, preferably, the rubber composition comprises from 0 to less than 2 phr of a coupling agent, more preferably from 0 to less than 1 phr of a coupling agent; more preferably still, it does not comprise a coupling agent. In the case where the rubber composition does not comprise a coupling agent, the silica is not regarded as a reinforcing filler and the rubber composition preferably comprises a covering agent which is preferably a polyethylene glycol. Any one embodiment of the invention applies to this alternative form, and also to the preferred forms of this alternative form.

According to another alternative form of the invention, the reinforcing inorganic filler, preferably a silica, represents more than 50% by weight of the reinforcing filler of the rubber composition. It is then considered that the reinforcing inorganic filler is the predominant reinforcing filler. According to this alternative form in which the reinforcing inorganic filler is the predominant reinforcing filler, in particular when silica is the predominant reinforcing filler, the carbon black is preferably used at a content of less than 20 phr, more preferably of less than 10 phr (for example, between 0.5 and 20 phr, in particular between 2 and 10 phr). Within the intervals indicated, the colouring properties (black pigmenting agent) and UV-stabilizing properties of the carbon blacks are benefited from, without, moreover, adversely affecting the typical performance properties contributed by the reinforcing inorganic filler.

The content of reinforcing filler is preferably within a range extending from 10 to 160 phr. Below 10 phr, the reinforcement of the rubber composition can be insufficient to contribute an appropriate level of cohesion or wear resistance of the rubber component of the tyre comprising this composition. Above 160 phr, there exists a risk of increasing the hysteresis of the rubber composition and thus a risk of heating the tread and the tyre. The content of reinforcing filler is more preferably from 25 to 100 phr, more preferably still from 35 to 85 phr. These contents of reinforcing filler, whether or not they are preferred, apply to any one of the embodiments of the invention.

The rubber composition can also comprise all or a portion of the usual additives customarily used in elastomer compositions, such as, for example, plasticizers, pigments, protective agents, such as antiozone waxes, chemical antiozonants or antioxidants, antifatigue agents, a crosslinking system, vulcanization accelerators or retardants, or vulcanization activators. According to any one embodiment of the invention, the crosslinking system is preferably based on sulphur but it can also be based on sulphur donors, on peroxide, on bismaleimides or on their mixtures.

The rubber composition can be manufactured in appropriate mixers, using two successive phases of preparation well known to a person skilled in the art: a first phase of thermomechanical working or kneading ("non-productive" phase) at high temperature, up to a maximum temperature of between 130° C. and 200° C., followed by a second phase of mechanical working ("productive" phase) down to a lower temperature, typically below 110° C., for example between 40° C. and 100° C., during which finishing phase the crosslinking system is incorporated.

The process for preparing the tread in accordance with the invention comprises, for example, the following stages:
  adding, during a first "non-productive" stage, to the elastomer matrix, the reinforcing filler and, if appropriate, the coupling agent, by kneading thermomechanically until a maximum temperature of between 130° C. and 200° C. is reached,
  cooling the combined mixture to a temperature of less than 70° C.,
  subsequently incorporating the crosslinking system,
  kneading everything up to a maximum temperature of less than 90° C. in order to obtain a mixture, then calendering or extruding the mixture obtained in order to form a tread.

Whatever the embodiment of the invention, the tread can be in the raw state (before crosslinking or vulcanization) or in the cured state (after crosslinking or vulcanization).

The invention also relates to a rubber composition which is identical to the rubber composition of the tread in accordance with the invention, with the condition that, if the reinforcing filler comprises a carbon black, the carbon black exhibits a BET specific surface of greater than or equal to 90 $m^2/g$, preferably of greater than or equal to 100 $m^2/g$.

The rubber composition, which is a specific subject-matter of the invention, can be prepared according to a process which comprises the following stages:
  thermomechanically kneading the elastomer matrix, the reinforcing filler and, if appropriate, the coupling agent until a maximum temperature of between 130° C. and 200° C. is reached;
  cooling the combined mixture to a temperature of less than 70° C.;
  subsequently incorporating the crosslinking system;
  kneading everything up to a maximum temperature of less than 90° C., in order to obtain a rubber composition.

The invention relates to the compositions, the tyres and the tyre treads described above, both in the raw state (that is to say, before curing) and in the cured state (that is to say, after crosslinking or vulcanization).

The abovementioned characteristics of the present invention, and also others, will be better understood on reading the following description of several implementational examples of the invention, given by way of illustration and without limitation.

III. IMPLEMENTATIONAL EXAMPLES OF THE INVENTION

The formulation of compositions T1, A and B is described in Table I and that of compositions C and T2 is described in Table II.

Compositions A to C are in accordance with the invention in that the elastomer matrix comprises natural rubber and at most 50% by weight of an unsaturated thermoplastic styrene elastomer in accordance with the invention. They differ from one another in the content of the unsaturated thermoplastic styrene elastomer or the nature of the filler. Compositions A and B differ from composition C in particular in that carbon black is the predominant reinforcing filler in compositions A and B whereas, in composition C, silica is the predominant reinforcing filler. Composition T1, in which carbon black is the predominant reinforcing filler and the elastomer matrix contains 100% natural rubber, is the control composition for compositions A and B. Composition T2, in which silica is the predominant reinforcing filler and the elastomer matrix contains 100% natural rubber, is the control composition for composition C. Compositions T1, T2, A, B and C are prepared in accordance with the process described above.

The compositions thus obtained are subsequently calendered, either in the form of plaques (with a thickness ranging from 2 to 3 mm) or thin sheets of rubber, for the measurement of their physical or mechanical properties, or in the form of profiled elements which can be used directly, after cutting and/or assembling to the desired dimensions, as tyre tread.

The results are recorded in Table III for compositions A and B and control composition T1 and in Table IV for composition C and control composition T2.

In the case where the reinforcing filler is predominantly a carbon black, the results which appear in Table III show a very strong improvement in the resistance to crack propagation for A and B, in comparison with the control T1. This improvement is observed both at 20° C. and at 80° C. for A. This temperature polyvalency demonstrates a good resistance to crack propagation for A for a broad temperature range to which a tread may be exposed.

When the reinforcing filler is predominantly a silica, the results recorded in Table IV demonstrate a strong improvement in the resistance to crack propagation of C in accordance with the invention, in comparison with the control T2.

Treads based on compositions A to C make it possible to significantly improve the lifetime of tyres since these tyres become much less sensitive to crack propagation at their treads.

TABLE I

|  | T1 | A | B | D |
|---|---|---|---|---|
| NR (1) | 100 | 60 | 70 | 60 |
| SIS (2) | — | 40 | 30 | — |
| SBIS (3) |  |  |  | 40 |
| Silica (4) | 15 | 15 | 15 | 15 |
| Carbon black (5) | 40 | 40 | 40 | 40 |
| Antioxidant | 2.5 | 2.5 | 2.5 | 2.5 |
| Paraffin | 1 | 1 | 1 | 1 |
| PEG (6) | 2.5 | 2.5 | 2.5 | 2.5 |
| Stearic acid | 1 | 1 | 1 | 1 |
| ZnO | 2.7 | 2.7 | 2.7 | 2.7 |
| CBS (7) | 1 | 1 | 1 | 1 |
| Sulphur | 1.7 | 1.7 | 1.7 | 1.7 |

(1) natural rubber
(2) SIS, D1161, sold by Kraton
(3) SBIS, D1170, sold by Kraton
(4) Ultrasil VN3, sold by Evonik
(5) N115
(6) polyethylene glycol with an Mn of 6000-20 000 g/mol, from Sasol Marl
(7) N-cyclohexyl-2-benzothiazolesulphenamide, Santocure CBS, sold by Flexsys

TABLE II

|  | T2 | C |
|---|---|---|
| NR (1) | 100 | 60 |
| SIS (2) |  | 40 |
| Silica (3) | 15 | 15 |
| Silica (4) | 47 | 47 |
| Silane (5) | 4 | 4 |
| DPG (6) | 1 | 1 |
| Antioxidant | 2.5 | 2.5 |
| Paraffin | 1 | 1 |
| PEG (7) | 2.5 | 2.5 |
| Stearic acid | 1 | 1 |
| ZnO | 2.7 | 2.7 |
| CBS (8) | 1 | 1 |
| Sulphur | 1.7 | 1.7 |

(1) natural rubber
(2) SIS, D1161, sold by Kraton
(3) Ultrasil VN3, sold by Evonik
(4) Zeosil 1165 MP, from Rhodia (HDS type)
(5) TESPT, Si69, from Evonik
(6) diphenylguanidine, Perkacit DPG, from Flexsys
(7) polyethylene glycol with an Mn of 6000-20 000 g/mol, from Sasol Marl
(8) N-cyclohexyl-2-benzothiazolesulphenamide, Santocure CBS, sold by Flexsys

TABLE III

| Resistance to crack propagation | T1 | A | B | D |
|---|---|---|---|---|
| at 20° C. | 100 | 475 | 185 | Not measured |

TABLE III-continued

| Resistance to crack propagation | T1 | A | B | D |
|---|---|---|---|---|
| at 60° C. | 100 | 372 | Not measured | 372 |
| at 80° C. | 100 | 500 | Not measured | Not measured |

TABLE IV

| Resistance to crack propagation | T2 | C |
|---|---|---|
| at 60° C. | 100 | 250 |

The invention claimed is:

1. A tire tread comprising a composition based on at least:
an elastomer matrix comprising a polyisoprene and an unsaturated thermoplastic styrene elastomer which represents at most 50% by weight of the elastomer matrix, said unsaturated thermoplastic styrene elastomer comprising at least one rigid styrene segment and at least one flexible isoprene segment, and said at least one flexible isoprene segment having a glass transition temperature of less than −20° C.;
a reinforcing filler; and
a crosslinking system.

2. The tire tread according to claim 1, wherein the polyisoprene represents more than 50% of the difference between the weight of the elastomer matrix and the weight of the unsaturated thermoplastic styrene elastomer.

3. The tire tread according to claim 1, wherein the polyisoprene represents more than 50% by weight of the elastomer matrix.

4. The tire tread according to claim 1, wherein the elastomer matrix consists of a mixture of the polyisoprene and of the unsaturated thermoplastic styrene elastomer.

5. The tire tread according to claim 1, wherein the at least one rigid styrene segment exhibits a glass transition temperature of greater than 80° C.

6. The tire tread according to claim 1, wherein the at least one rigid styrene segment is a polystyrene block.

7. The tire tread according to claim 1, wherein the at least one flexible isoprene segment is a polyisoprene block.

8. The tire tread according to claim 1, wherein the polyisoprene comprises a content by weight of cis-1,4-bonds of at least 90% of the weight of the polyisoprene.

9. The tire tread according to claim 8, wherein the polyisoprene is natural rubber, a synthetic polyisoprene or a mixture thereof.

10. The tire tread according to claim 1, wherein the unsaturated thermoplastic styrene elastomer is a diblock comprising only one rigid styrene segment connected to only one flexible isoprene segment.

11. The tire tread according to claim 10, wherein the unsaturated thermoplastic styrene elastomer is a styrene/isoprene (SI) block copolymer.

12. The tire tread according to claim 1, wherein the reinforcing filler comprises a carbon black.

13. The tire tread according to claim 12, wherein the carbon black represents more than 50% by weight of the reinforcing filler.

14. The tire tread according to claim 12, wherein the carbon black exhibits a BET specific surface of at least 90 m²/g, preferably of at least 100 m²/g.

15. The tire tread according to claim 1, wherein the unsaturated thermoplastic styrene elastomer comprises at least two rigid styrene segments.

16. The tire tread according to claim 15, wherein the unsaturated thermoplastic styrene elastomer is a triblock composed of two rigid styrene segments and of one flexible isoprene segment.

17. The tire tread according to claim 16, wherein the unsaturated thermoplastic styrene elastomer is a styrene/isoprene/styrene (SIS) block copolymer.

18. The tire tread according to claim 1, wherein the at least one flexible isoprene segment has a glass transition temperature of less than −30° C.

19. The tire tread according to claim 18, wherein the at least one flexible isoprene segment has a glass transition temperature of less than −40° C.

20. The tire tread according to claim 19, wherein the at least one flexible isoprene segment has a glass transition temperature of less than −50° C.

21. The tire tread according to claim 1, wherein the reinforcing filler comprises a reinforcing inorganic filler.

22. The tire tread according to claim 21, wherein the reinforcing inorganic filler is a silica.

23. The tire tread according to claim 21, wherein the rubber composition comprises a coupling agent.

24. The tire tread according to claim 21, wherein the reinforcing inorganic filler represents more than 50% by weight of the reinforcing filler.

25. The tire tread according to claim 1, wherein the content of unsaturated thermoplastic styrene elastomer represents from 5 to 50% by weight of the weight of the elastomer matrix.

26. The tire tread according to claim 25, wherein the content of unsaturated thermoplastic styrene elastomer represents from 10 to 45% by weight of the weight of the elastomer matrix.

27. The tire tread according to claim 26, wherein the content of unsaturated thermoplastic styrene elastomer represents from 20 to 45% by weight of the weight of the elastomer matrix.

28. The tire tread according to claim 27, wherein the content of unsaturated thermoplastic styrene elastomer represents from 25 to 45% by weight of the weight of the elastomer matrix.

29. A process for preparing a tread according to claim 1, said process comprising the steps of:
adding, during a first non-productive stage, to the elastomer matrix, the reinforcing filler and, if appropriate, the coupling agent, by kneading thermomechanically until a maximum temperature of between 130° C. and 200° C. is reached;
cooling the mixture to a temperature of less than 70° C.;
subsequently incorporating the crosslinking system;
kneading the mixture up to a maximum temperature of less than 90° C.; and
then calendering or extruding the mixture obtained in order to form a tread.

30. A tire comprising a tread according to claim 1.

* * * * *